(12) United States Patent
Yuan et al.

(10) Patent No.: US 6,636,992 B1
(45) Date of Patent: Oct. 21, 2003

(54) METHOD FOR RENEWING PROGRAM CODE IN AN EMBEDDED MICRO-CONTROLLER UNIT

(75) Inventors: Chung-Pin Yuan, Taoyuan (TW); Chi-Tien Chen, Taoyuan (TW); Ping-Fa Tang, Hsinchu (TW)

(73) Assignee: Myson Century, Inc. (TW)

( * ) Notice: Subject to any disclaimer, the term of this patent is extended or adjusted under 35 U.S.C. 154(b) by 548 days.

(21) Appl. No.: 09/688,994

(22) Filed: Oct. 16, 2000

(30) Foreign Application Priority Data

Sep. 8, 2000 (TW) ........................... 89118545 A

(51) Int. Cl.⁷ ............................................. G06F 11/08
(52) U.S. Cl. ............................................. 714/52
(58) Field of Search ................ 714/52, 722, 758, 714/807; 365/201, 221; 713/100

(56) References Cited

U.S. PATENT DOCUMENTS 6,446,238 B1 * 9/2002 Canestaro et al. .......... 714/807
6,567,930 B1 * 5/2003 Moriya ........................ 714/23

* cited by examiner

*Primary Examiner*—Scott Baderman
(74) *Attorney, Agent, or Firm*—Hayes Soloway P.C.

(57) ABSTRACT

The embedded micro-controller unit includes a serial interface according to the present invention. A program control device connects the embedded micro-controller unit. The serial interface will send a request signal to a microprocessor while renewing program codes. The microprocessor will transfer the power of controlling program memory to the serial interface and then go into idle state or halt state after receiving the request signal. The program control device may directly write new program codes into the program memory through the serial interface.

5 Claims, 2 Drawing Sheets

METHOD FOR RENEWING PROGRAM CODE IN AN EMBEDDED MICRO-CONTROLLER UNIT

FIELD OF THE INVENTION

The present invention relates to a method for program writing and more particularly to a method for writing programs in application system.

BACKGROUND OF THE INVENTION

Computer systems can be categorized into reprogrammable system and embedded ones according to their characteristic. The reprogrammable system is similarly to the personal computer comprising storage devices for storing a lot of data, a keyboard for inputting information and a display for showing the result. The programs can be stored in the storage devices, then users can use the keyboard to input special command to call the program to process and the processing result will be showed in the display. The programmers can correct or rewrite the programs if needed.

Embedded system is the so-called single chip microprocessor. In this kind of embedded system, the program memory and input/output devices are embedded into one chip. The program code is then written into the program memory by a writer so as to carry out special process, such as micro-controlling a machine, etc. The single chip microprocessor may be therefore called microntroller or embedded micro-controller unit, i.e. embedded MCU. Utilizing the embedded system in a microcomputer system may simplify design and reduce the manufacture cost due to the elimination of considering the design of the interface between the memory and input/output units.

FIG. 1 shows a block diagram of micro-controller 100 comprising a micro processor 102, a program memory 104 and a plurality of function blocks 106. The input/output, processing and calculation of data are sequentially executed according to instruction in the program by micro processor 102. In the programming process, after receiving the input information, the micro processor 102 may call application programs and read data stored in program memory 104 through a buffer, and then processes and calculates the data according to the instructions in the application program. The micro processor will send the processed result to the output devices or utilize it to drive a plurality of function blocks 106.

FIG. 2 shows a block diagram of embedded micro-controller application system 200, which comprises input device 202, embedded micro-controller unit 100 and a plurality of function blocks. The input device, after receiving the input information, may transfer a required signal and input information to the embedded micro-controller unit 100. The embedded micro-controller unit 100, after receiving the signal and information, may process the received information and then transfer the calculating result to function block 204 for the subsequent processing.

The program code, e.g. important application programs and basic input/output operating system, i.e. BIOS, stored in the program memory 104 must not bedeleted when the power applied to the program memory 104 is removed. However, the program code often needs to be corrected often during the stages of software development or renewing the software function. The flash erasable and programmable read only memory, flash EPROM, is the popular program memory in the industry.

There are two methods to write program code into the flash EPROM. One is to take apart the embedded micro-controller unit from the system and then put it in the EPROM writer to write the program code into the flash EPROM. The embedded micro-controller unit needs to be taken apart from the system repeatedly when correcting the bugs, the machine therefore needs to be shut down during the renewing process, which may interrupt the manufacturing process. The other one is in-system programming. The embedded micro-controller unit does not need to be taken apart from the system during the writing process according to the method. The system may therefore maintain the basic function. However, the micro-processor's reading the renewing data will cause the system to perform wrongly. The micro-processor may hence move to the other program memory to work for avoiding performing wrong job. The micro-processor will transfer those data to a program memory which needs to be renewed after receiving data. However, their exists some drawbacks in the method. The writing process will reduce operation speed of the micro-processor due to the micro-processor's participatiom. On the other hand, the method requires additional program memory to provide the micro-processor operation during the writing process, which will increase the manufacture cost. Another in system programming method is setting the embedded micro-controller unit to reset state immediately while the micro-processor in the unit receives the request of renewing the program code. The output port and function block of the micro-processor may not work under this situation and thus the possibility for the whole system damage will increase.

SUMMARY OF THE INVENTION

It is therefore a main objective of the present invention to provide an improved method for writing program codes. The embedded micro-controller application system according to the present invention includes an embedded micro-controller unit having one two-pin serial interface. A program control device connects to the embedded micro-controller application system to write the program codes into a flash EPROM. The implementation of using a serial interface to write program codes is capable of reducing the time consuming because the program codes may be written into the program memory directly through the serial interface so as to eliminate the micro-processor participating step and improve the writing speed.

Another objective of the invention is to provide one two-pin serial interface for directly writing program code into the program memory. The control method is therefore easy due to the two pins writing process.

In accordance with the above objectives of the present invention, a new method is provided in the embedded micro-controller application system for directly writing program code into the flash EPROM.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The embedded micro-controller application system will be shut down or reset to avoid reading the wrong program codes during the conventional writing process. The damage risk for the system may therefore increase under this situation. The present invention provides a new method to solve the foregoing problem. The embedded micro-controller application system according to the present invention includes an embedded micro-controller unit having one two-pin serial interface. A program control device is connected to the embedded micro-controller application system to write the program codes into the flash EPROM. The program control device may directly write the program codes into the flash EPROM through the serial interface. The control method is therefore easy due to the two-pin interface writing process. The other advantage is that the embedded micro-controller application system do not need to be shut down or reset during renewing program code process according to the present invention, the system therefore has long life cycle and excellent reliability.

The following describes a preferred embodiment of the present invention. The embedded micro-controller application system according to the present invention includes an embedded micro-controller unit having one two-pin serial interface. A program control device is connected to the embedded micro-controller application system. The two-pin serial interface will receive a request signal of renewing program codes from the program control device while the renewing process begin. The serial interface will transfer the request signal of renewing program code to the micro-processor. The micro-processor will go into idle state or halt state after receiving the request signal, which avoid micro-processor continually reading program code during renewing process. This kind of control method is easy to use because of only adding a two-pin serial interface. The method according to the present invention may therefore have better effect and writing speed than conventional methods.

Figure 1:
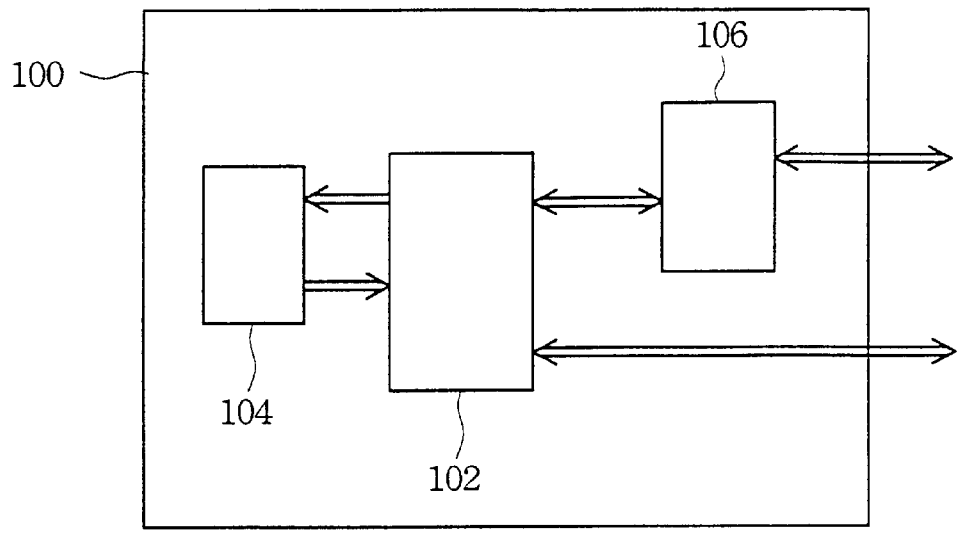
FIG. 1 is a block diagram showing the conventional embedded micro-controller unit.
Figure 2:
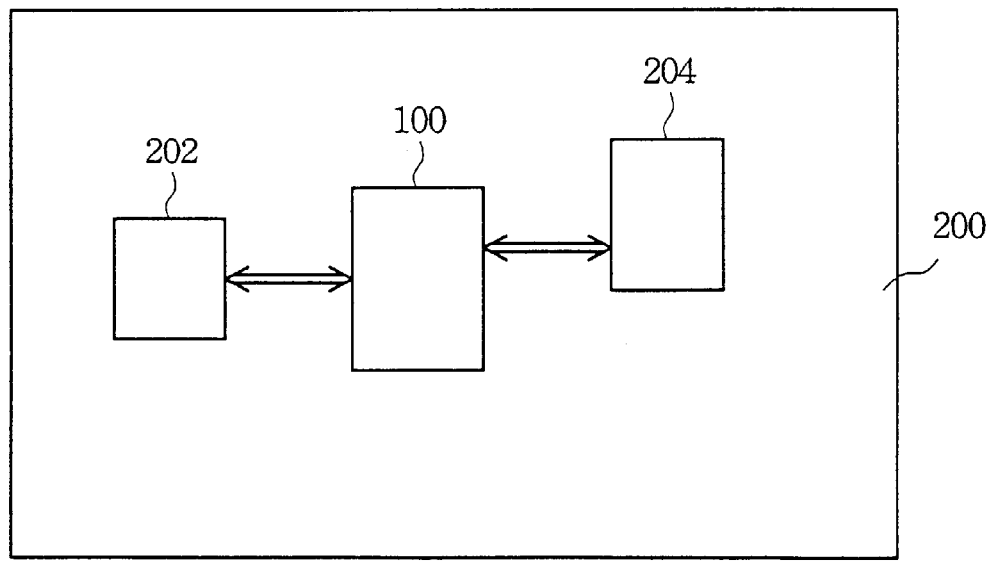
FIG. 2 is a block diagram showing the conventional embedded micro-controller application system.
Figure 3:
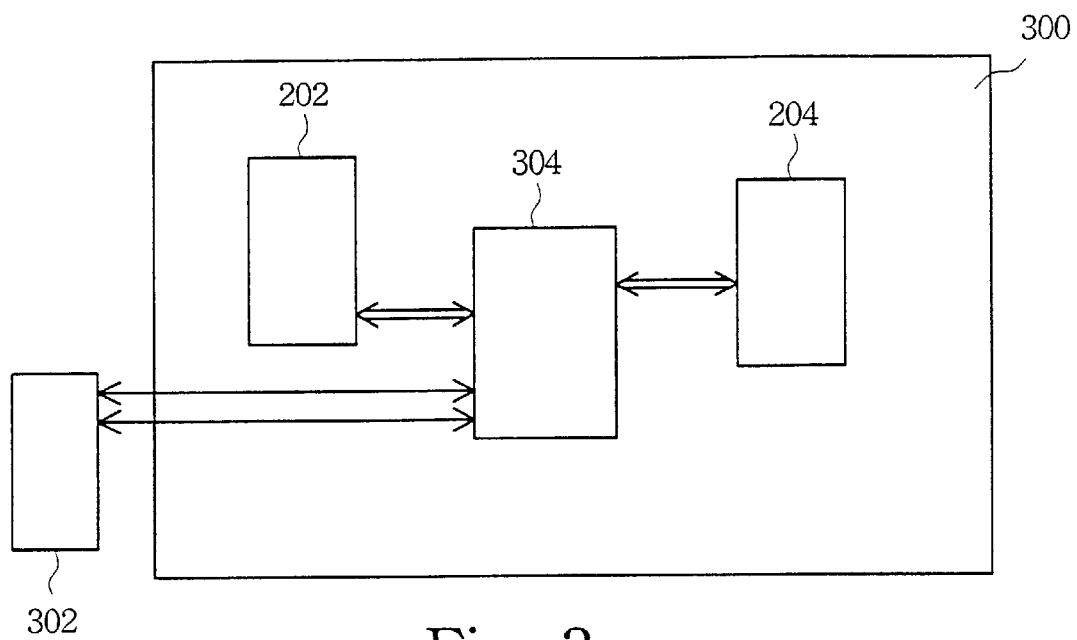
FIG. 3 is a block diagram showing the embedded micro-controller application system according to the present invention.

FIG. 3 describes the blocks of the application system according to the present invention. The frame of the application system includes an embedded micro-controller application system 300 and a program control device 302 connecting to the system 300, wherein the program control device 302 is the host to control the writing process. The embedded micro-controller application system 300 includes an embedded micro-controller unit 304, function device 204 and input device 202, wherein the embedded micro-controller unit 304 may control the function device 204 when the whole system begin to work. The input device 202, after receiving the input information, may send it to the embedded micro-controller unit 304. The embedded micro-controller unit 304, after receiving the input information, may begin to process it and then transfer the result to function block 204 for the subsequent processing. On the other hand, the program control device 302 will send a request signal to the embedded micro-controller unit 304 when renewing the program code. The embedded micro-controller unit 304 will begin the renewing work after receiving the request signal.

Figure 4:
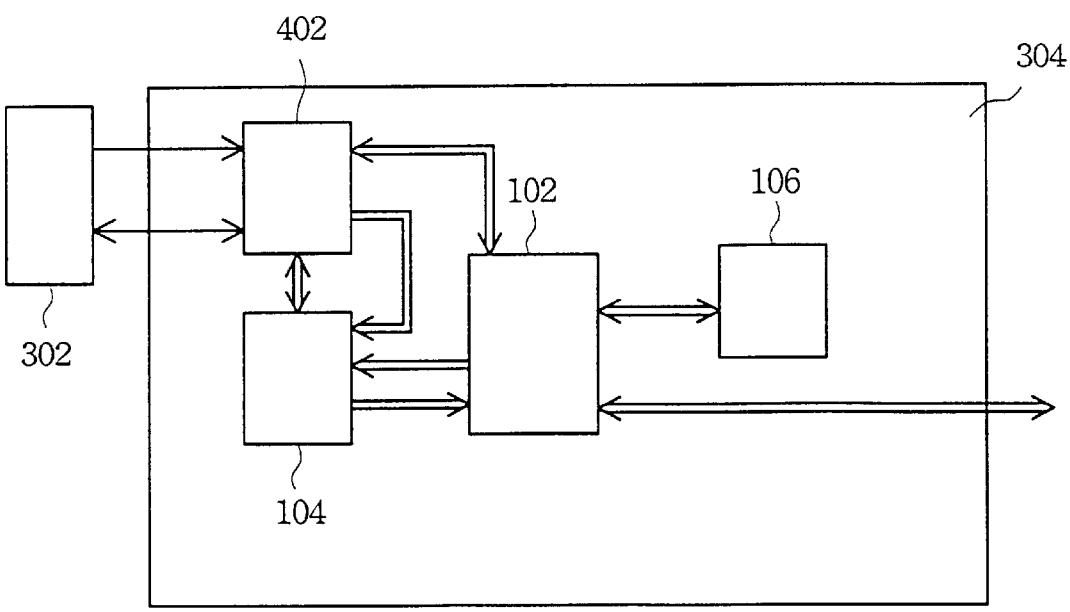
FIG. 4 is a block diagram showing the embedded micro-controller unit according to the present invention.

FIG. 4 describes the frame of the embedded micro-controller unit 304. The embedded micro-controller unit 304 includes an micro-processor 102, a program memory 104, a plurality of function blocks 106 and a two-pin serial interface 402, wherein the serial interface 402 connects the program control device 302. The micro-processor 102 processes the data according to the application program instructions. The micro processor 102 may generally call application program and read data stored in program memory 104 through the buffer after receiving the input information, and then the micro-processor 102 will process and calculate the data. The result will be sent to the output devices and drives a plurality of function blocks 106.

The serial interface 402 will send a request signal to micro-processor 102 when the writing work begins. The micro-processor 102 will transfer the power of controlling program memory to serial interface 402 and then go into idle state or halt state after receiving the request signal. The program control device 302 may directly write new program codes into the program memory 104 through the serial interface 402. Since the micro-processor 102 does not participate in the step, the writing program code speed will increase. On the other hand, the method according to the present invention is not similar to the conventional method requiring additional program memory for micro-processor 102 processing during writing process. The method according to the present invention will reduce the manufacture cost.

The serial interface 402 may calculate and store the cyclic redundancy check codes of transmission program codes during the receiving process. Comparing the cyclic redundancy check code stored in program control device 302 with that stored in serial interface 402 after the writing process may determine whether the writing program code process is successful or not. The program control device 302, after successfully writing the program codes into the program memory 104, will require the embedded micro-controller unit 304 to go into reset state, which is not similar to the conventional methods requiring the embedded micro-controller unit 304 to go into reset state immediately while receiving the request signal of renewing program codes. The method, according to the present invention, may therefore avoid the damage due to temporary idleness of micro-processor 102 and function block 106. The cyclic redundancy check code which comes from the redundancy of two-bit transmission data is divided by one fix two-bit number. The redundancy is stored with the data. The code is checked by comparing the stored cyclic redundancy check code while receiving or reading data to find the wrong code.

As is understood by a person skilled in the art, the foregoing preferred embodiments of the present invention are used to illustrate the present invention rather than to limit the present invention. It is intended to cover various modifications and similar arrangements included within the spirit and scope of the appended claims, the scope of which should be accorded the broadest interpretation so as to encompass all such modifications and similar structure.

What is claimed is:

1. A method for renewing program codes in an embedded micro-controller unit comprising the steps of:
   sending a request signal from an output device to a micro-processor through an interface;
   said micro-processor will go into idle state or halt state and transfer the power of controlling program memory to said interface after receiving said request signal;
   after writing data from said output device into a memory through said interface, said interface will record check code;
   comparing said check code recorded by said interface with that recoded by said output device;

when code checking is correct, said output device will send a reset signal to said micro-processor through said interface; and rewriting said data to said memory, when code checking is wrong.

2. The method of claim 1, wherein said output device is a program control device that is a host for writing new program codes.

3. The method of claim 1, wherein said interface is a two-pin interface.

4. The method of claim 1, wherein said memory is a flash erasable and programmable read only memory.

5. The method of claim 1, wherein said check code is cyclic redundancy check code wherein the cyclic redundancy check code which comes from the redundancy of two-bit transmission data is divided by one fix two-bit number.

* * * * *